US007888631B2

(12) United States Patent
Bronson et al.

(10) Patent No.: US 7,888,631 B2
(45) Date of Patent: Feb. 15, 2011

(54) SHIELDED SOURCE DETECTION AND ACTIVITY CORRECTION SYSTEM

(75) Inventors: Fazier Bronson, Branford, CT (US); William Russ, East Hampton, CT (US)

(73) Assignee: Canberra Industries, Inc., Meriden, CT (US)

( * ) Notice: Subject to any disclaimer, the term of this patent is extended or adjusted under 35 U.S.C. 154(b) by 253 days.

(21) Appl. No.: 12/067,609

(22) PCT Filed: Aug. 11, 2006

(86) PCT No.: PCT/US2006/031503
§ 371 (c)(1),
(2), (4) Date: Apr. 30, 2008

(87) PCT Pub. No.: WO2007/022007
PCT Pub. Date: Feb. 22, 2007

(65) Prior Publication Data
US 2008/0308719 A1    Dec. 18, 2008

(51) Int. Cl.
*G01D 18/00*    (2006.01)

(52) U.S. Cl. .................................................. 250/252.1

(58) Field of Classification Search .............. 250/252.1, 250/362, 365, 393, 369, 395; 702/189
See application file for complete search history.

(56) References Cited

U.S. PATENT DOCUMENTS

| | | | |
|---|---|---|---|
| 5,076,993 A | 12/1991 | Sawa et al. | |
| 6,448,564 B1 * | 9/2002 | Johnson et al. | 250/394 |
| 7,462,837 B2 * | 12/2008 | Russ | 250/395 |
| 2003/0165213 A1 | 9/2003 | Maglich | |

OTHER PUBLICATIONS

Canberra Industries, Inc., Optional Genie-VMS Peak Search Programs, 2001, p. 1.*

* cited by examiner

*Primary Examiner*—David P Porta
*Assistant Examiner*—Faye Boosalis
(74) *Attorney, Agent, or Firm*—David W. Carstens; Steven H. Washam; Carstens and Cahoon, LLP

(57) ABSTRACT

The method of analyzing the measured radiation spectra to estimate the identified nuclide activities using a designated efficiency calibration based on average expected geometry and using spectral characteristics to flag significant shielding that would otherwise skew said nuclide activities (FIG. 5). And providing an estimation of activity correction factor or attenuation factor for each affected nuclide (200).

32 Claims, 5 Drawing Sheets

SHIELDED SOURCE DETECTION AND ACTIVITY CORRECTION SYSTEM

TECHNICAL FIELD

The present invention relates to gamma-ray spectroscopy generally and, more particularly to a novel shielded source detection and activity correction system.

BACKGROUND ART

An important result from the analysis of measured radiation spectra is an estimation of identified nuclide activities. These activity estimations are based on analyzing the system response using a designated efficiency calibration. The accuracy of the activity estimation depends directly on the accuracy of the efficiency calibration. When the measurement is conducted with limited knowledge of the source geometry the efficiency calibration is often based on an average expected geometry. When the actual source geometry differs from the average expected efficiency calibration by having a significant amount of unaccounted-for attenuating shielding, the reported activity will be significantly underestimated. However, there are spectral characteristics that can be used to both flag for the presence and then correct for significant shielding that would otherwise skew nuclide activity estimations.

Accordingly, it is a principal object of the invention to provide a system to reliably determine when significant source shielding is present to provide both a flag to alert an operator and possibly to trigger further automatic activity correction analysis.

It is a further object of the invention to provide such a system that uses spectral characteristics to correct for significant shielding that would otherwise skew nuclide activity estimations.

Other objects of the invention, as well as particular features and advantages thereof, will be apparent or be elucidated in the following description and the accompanying drawing figures.

DISCLOSURE OF INVENTION

The present invention achieves the above objects, among others, by providing, in a preferred embodiment, a method, comprising the steps of: analyzing measured radiation spectra to estimate identified nuclide activities using a designated efficiency calibration based on average expected geometry and using spectral characteristics to flag significant shielding that would otherwise skew said nuclide activities; and providing an estimation of activity correction factor or attenuation factor for each affected nuclide.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which.

BEST MODE FOR CARRYING OUT THE INVENTION

Figure 1:
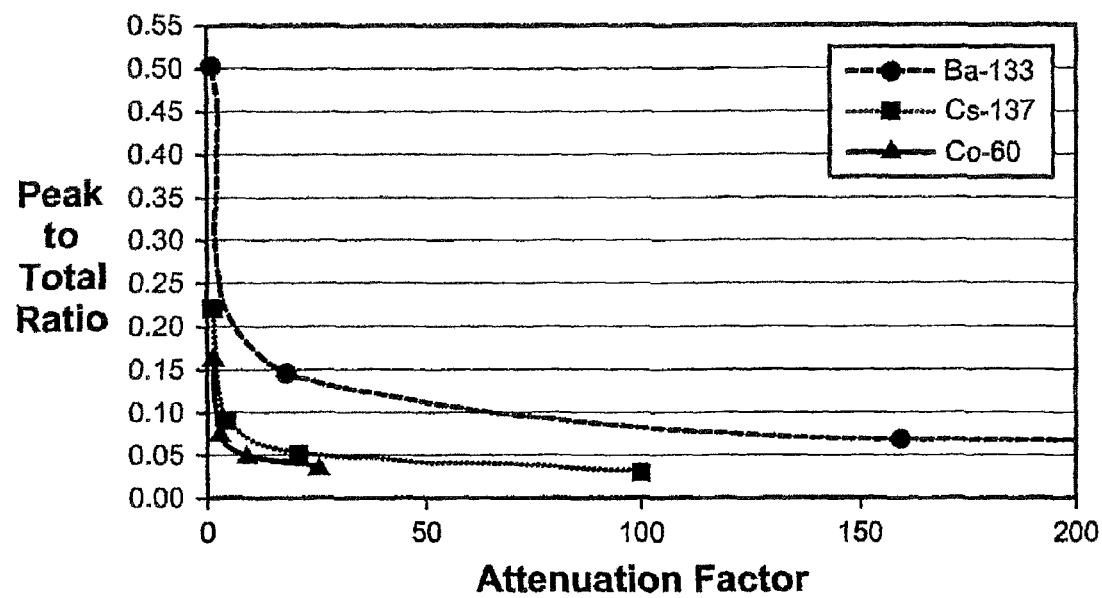
FIG. 1 is a graph of measured attenuating factor vs. peak to total ratios.

An important result from the analysis of measured radiation spectra is an estimation of identified nuclide activities. These activity estimations are based on analyzing the system response using a designated efficiency calibration. The accuracy of the activity estimation depends directly on the accuracy of the efficiency calibration. When the measurement is conducted with limited knowledge of the source geometry the efficiency calibration is often based on an average expected geometry. When the actual source geometry differs from the average expected efficiency calibration by having a significant amount of unaccounted-for attenuating shielding, the reported activity will be significantly underestimated. However, there are spectral characteristics that can be used to both flag and correct for significant shielding that would otherwise skew nuclide activity estimations. The purpose of the proposed shielded source detection and activity correction system is to reliably determine when significant source shielding is present and to provide an estimation of the activity correction factor or attenuation factor for each affected nuclide.

Shielding increases the degree of scattered response relative to unscattered response measured by the radiation detection system. This new shielded source detection and activity correction system analyzes this energy dependent scattering differential response by comparing the measured relative scattering characteristics to expected values for a range of shielding conditions. A gross spectral characteristic that is used to indicate whether shielding correction is warranted is the whole spectrum peak-to-total ratio. A lowered peak-to-total ratio is indicative of the presence of shielding. Individual nuclide attenuation factors are evaluated on a photopeak basis using the amount of excess counts in the scattered continuum just below the peak energy as compared to the region just above the peak, relative to the net peak area. This photopeak scattering metric is indexed by energy to an expected shielding response function previously characterized to yield the estimated attenuation factor used to correct the nuclide activity.

Because of the larger number of counts involved, analyzing the whole spectrum peak-to-total ratio tends to provide a statistically reliable indicator of whether the measurement involves significant scattering from shielding. Therefore, such an analysis is beneficial as an indicator prior to progressing with photopeak analysis to assess individual nuclide attenuation factors. The peak-to-total ratio is the ratio of the sum of all net peak areas in the spectrum to all of the counts in the spectrum. There are several ways to use this data to decide whether significant shielding is indicated, since this ratio has energy dependence. The measured peak-to-total ratio can be compared to a general threshold derived from the worst case energy so that any instance where the ratio was less than this unshielded value would flag significant shielding. The threshold can also be indexed by the weighted average energy of the spectrum photopeaks, weighted according to relative peak areas. This energy-indexed threshold could be derived using the detector intrinsic peak-to-total calibration applicable for an unshielded source. As each peak is tallied, the corresponding expected contribution to the total tally based on the calibration is likewise tallied as final input to the threshold calculation. The result is the calculated expected peak-to-total ratio for an unshielded source. An additional margin must be included to account for the uncertainty in the value and the degree of shielding deemed minimally significant.

Figure 2:
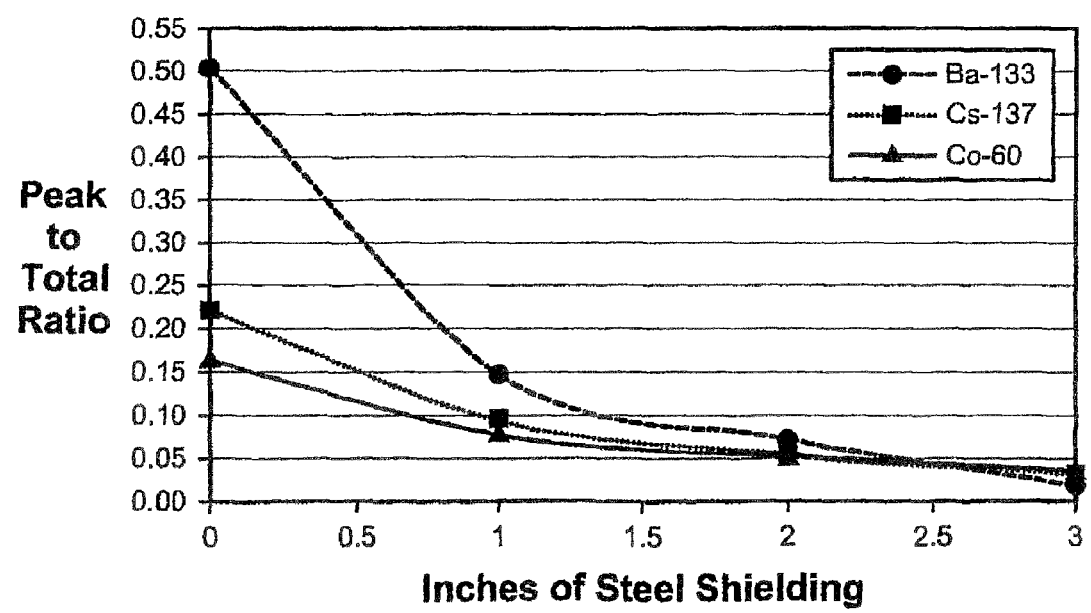
FIG. 2 is a graph of inches of steel shielding vs. peak to total ratios.

Measurements of $^{133}$Ba, $^{137}$Cs and $^{60}$Co were separately conducted with 0, 2.54, 5.08 and 7.62 cm of low background carbon steel shielding. The peak-to-total ratio was calculated for each of the 12 measurements. FIGS. 1 and 2 show the results plotted as a function of the measured attenuation factor and as a function of steel thickness. The results indicate that there is a distinct region of change where a threshold could be used to decide whether to flag the presence of significant shielding. This effect changes with energy, but seems to be sufficiently consistent to allow using a general threshold for a first order decision. This threshold would seem to be around 0.1 to 0.05. The benefit of performing this test prior to even attempting the following peak-specific analysis is that the statistical certainty of this holistic analysis is much greater, providing better confidence in the final result.

Figure 3:
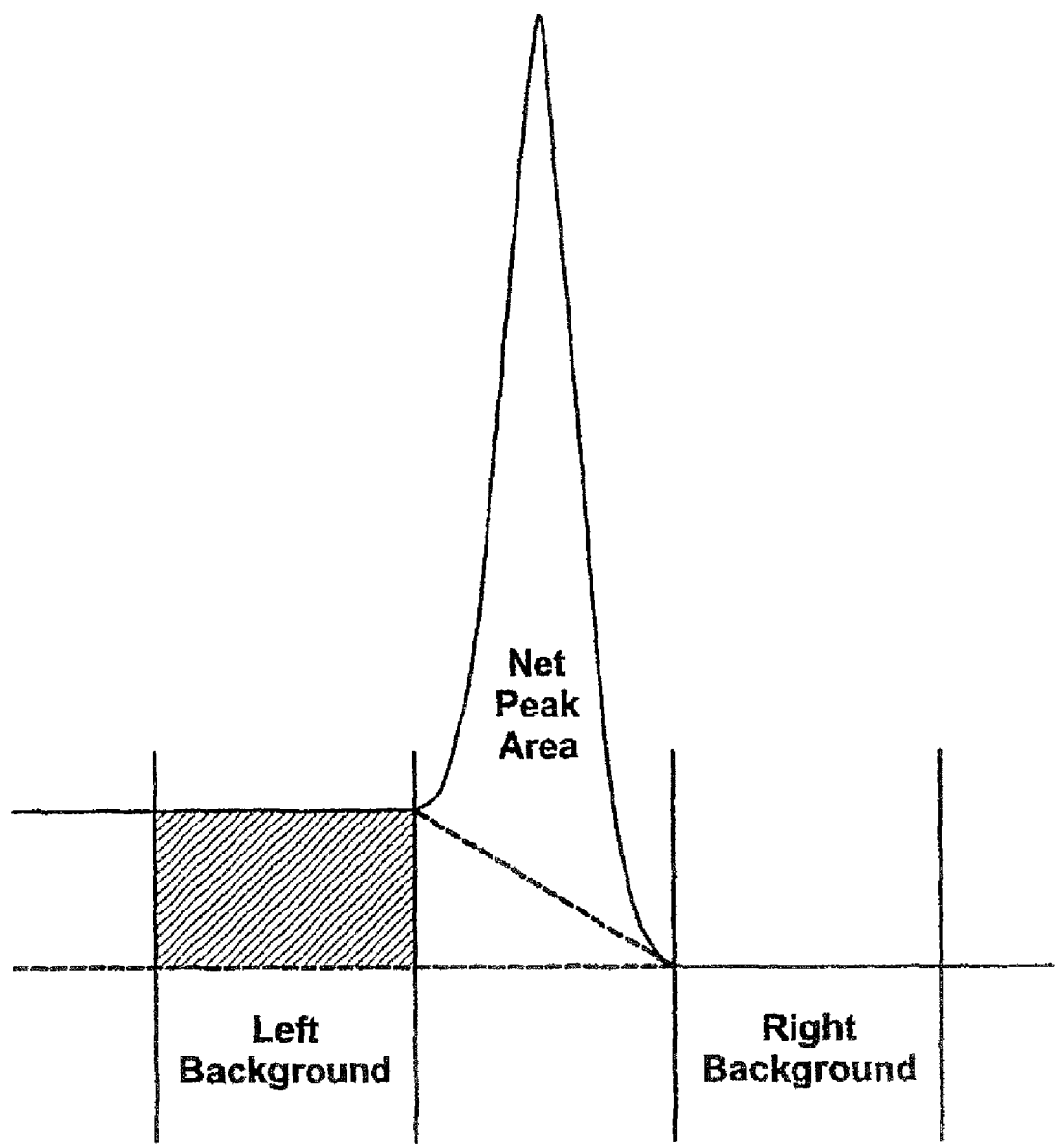
FIG. 3 is an illustration of how % fraction is determined: 100×shaded area/net peak area.

When significant shielding is considered likely to be present, the individual nuclide shielding corrections are determined by analyzing specific photopeaks. FIG. 3 shows the spectral characteristic (% Fraction) used to estimate the amount of shielding. The % Fraction is defined as the amount of downscatter (left background−right background) as a relative percentage of the photopeak area. The background widths used are standardized to values (4 Full Widths at Half Maximum, FWHM) that the measurement must be normalized against for consistent results. The % Fraction will vary both as a function of the amount of shielding and the energy of the photopeak. The energy dependence will emphasize this effect in a middle range correlating to the energy region dominated by Compton scattering. The empirical relationship between the % Fraction, photopeak energy and the associated attenuation factor caused by shielding can be characterized. Measured data can be related to this empirical characterization, yielding the likely attenuation factor to correct nuclide activity.

Figure 4:
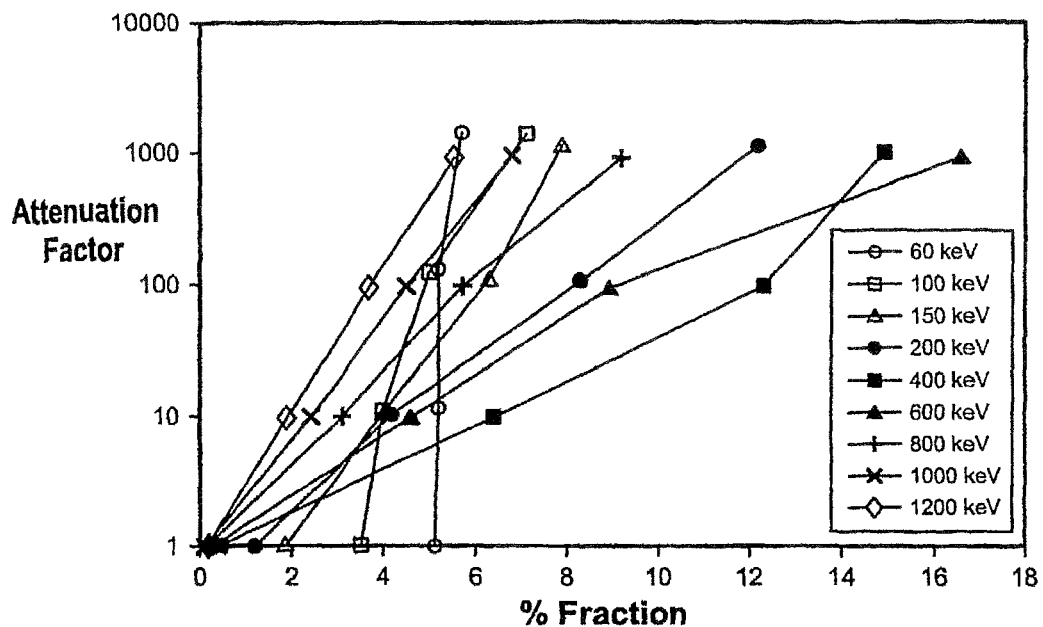
FIG. 4 is graph of % fraction vs. attenuation factor at various energies.
Figure 5:
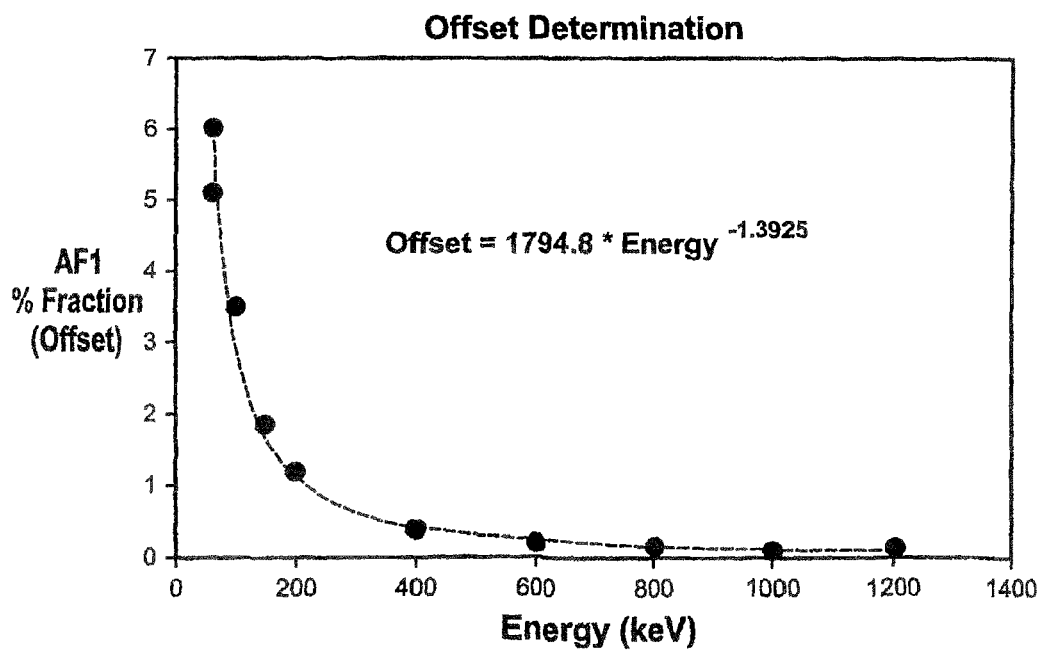
FIG. 5 is a graph of no shielding offset data with empirical function.
Figure 6:
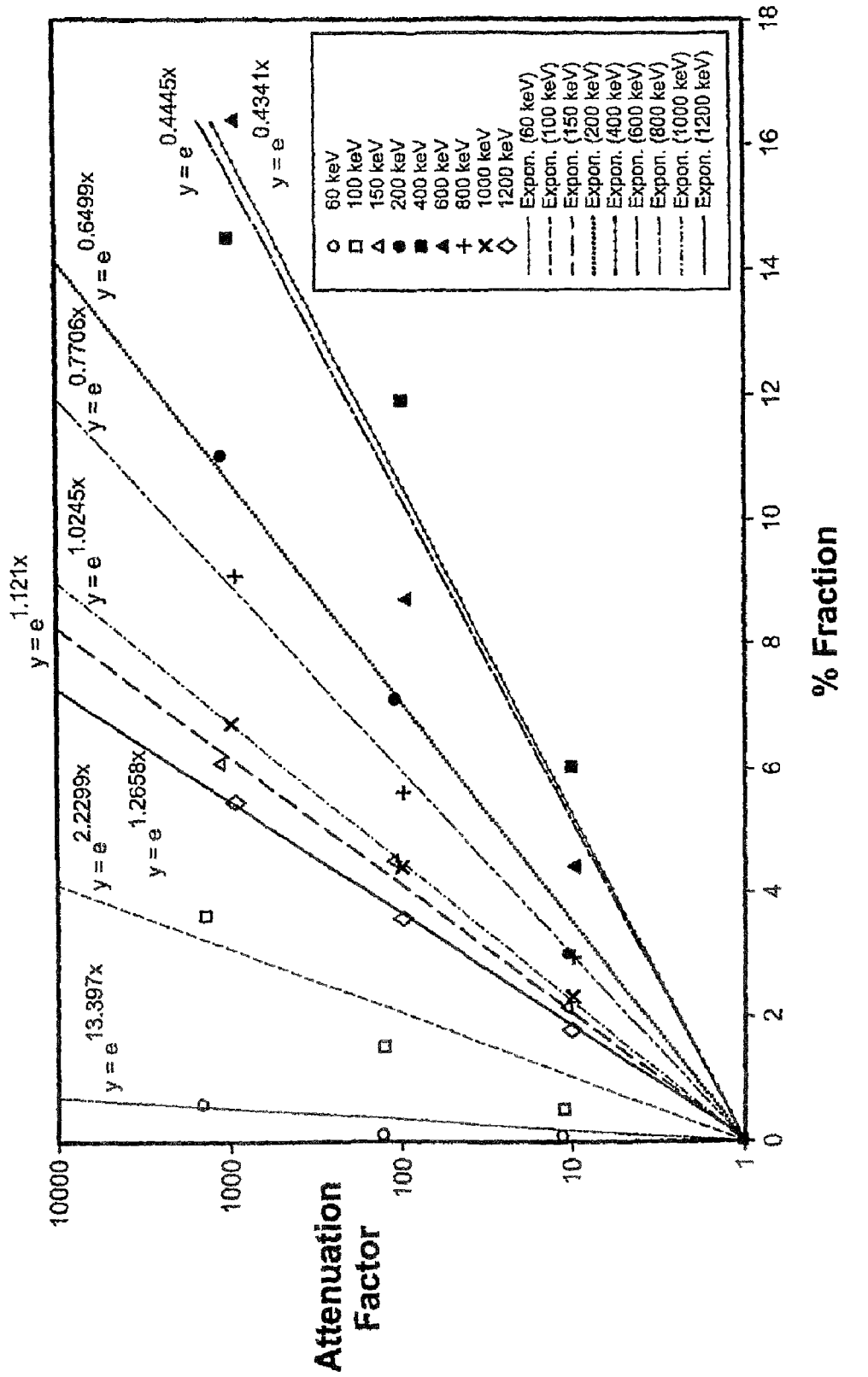
FIG. 6 is a graph of offset compensated data with exponential function estimates.
Figure 7:
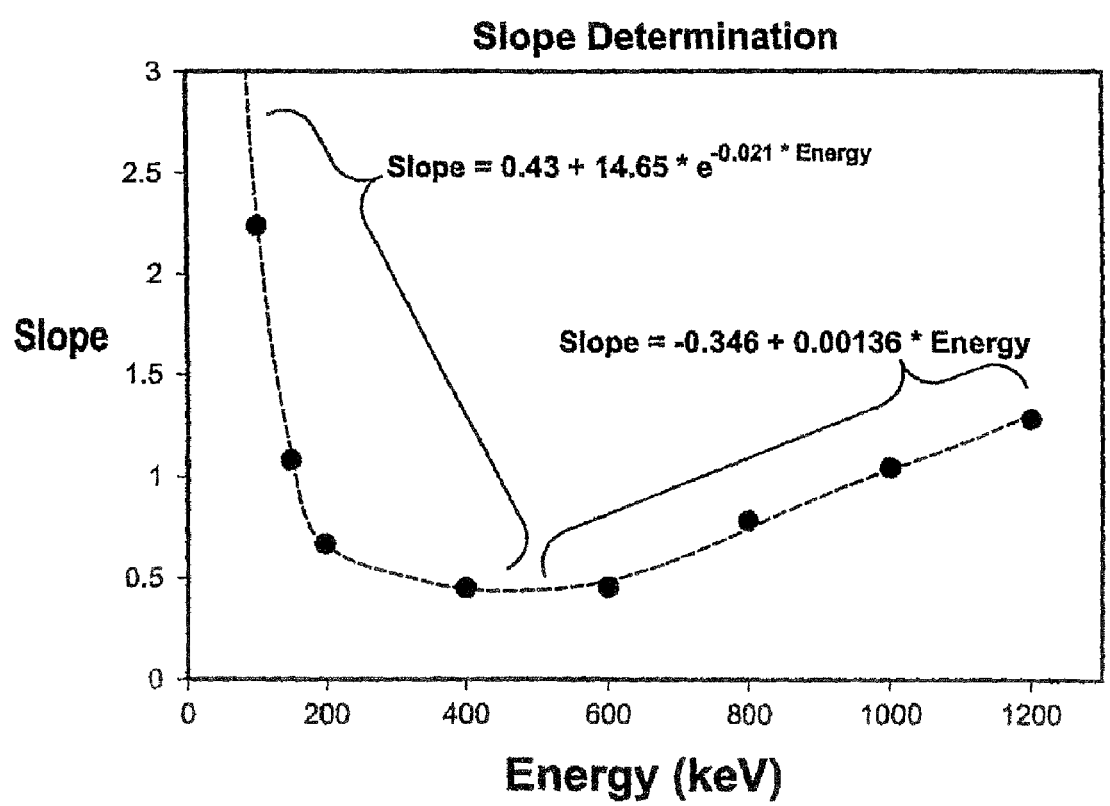
FIG. 7 is a graph of dual empirical function fit to exponential coefficient estimates.

The empirical characterization has been initially done using Monte Carlo modeling of High Purity Germanium (HPGe) detector response to a range of energies and steel shielding. FIG. 4 summarizes the results of this modeling. It is evident that there is an energy dependent offset with no shielding. FIG. 5 shows these data points and a function used to compensate this offset effect. After compensating the offset, the result is shown in FIG. 6. The best fit to this set of data appears to be an exponential with an energy dependent coefficient. The function used to estimate the exponential slope coefficient is shown in FIG. 7. Putting all of these functions together provides the characterization equation:

$$\text{Attenuation Factor} = e^{Slope \cdot (\% \ Fraction - Offset)}, \text{ where}$$

$$\text{Offset} = AF[6] \cdot Energy^{AF[7]}$$

$$\text{Slope} = \begin{cases} AF[1] + AF[2] \cdot e^{AF[3] \cdot Energy}, & Energy < 500 \text{ keV} \\ AF[4] + AF[5] \cdot Energy, & Energy \geq 500 \text{ keV} \end{cases}$$

The values for the coefficients AF[1-7] must be determined empirically. While Monte Carlo modeling of an ideal detection system yielded the values AF[0.43, 14.65, −0.021, −0.346, 0.00136, 1794.8, −1.3925], field measurements have suggested the values AF[0.3, 14.65, −0.394, 0.0004, 0.0003, 0.0082, 1.163]. A system-specific determination of these coefficients would provide optimal performance and may also better conform to a different appropriate parameterization form. It is best if this photopeak-specific analysis only be applied to peaks at energies that interpolate from the predetermined points and where the sensitivity is sufficient. Outside of the energy range of approximately 150 to 1500 keV, the variation in % Fraction is insufficiently sensitive to changes in shielding to be reliably used. Variations in the measured % Fraction may occur if the background continuum is sloped/curved or has features caused by higher energy photopeaks (backscatter peaks, Compton edges) in either background region. Such unpredictable features may dominate the determination of % Fraction, invalidating the output attenuation factor. Given that such effects are difficult to predict or correct for, the likely best alternative is to test for abnormal conditions to prevent implementation when the accuracy is dubious and to limit the attenuation factor output to a reasonable range.

In the embodiments of the present invention described above, it will be recognized that individual elements and/or features thereof are not necessarily limited to a particular embodiment but, where applicable, are interchangeable and can be used in any selected embodiment even though such may not be specifically shown.

It will thus be seen that the objects set forth above, among those elucidated in, or made apparent from, the preceding description, are efficiently attained and, since certain changes may be made in the above method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A method of analyzing measured radiation spectra to determine an estimated nuclide attenuation factor for use in nuclide activity measurements, the method steps comprising:

obtaining a whole spectrum peak-to-total counts ratio for at least one nuclide source from at least one radiation detector spectrometer device;

comparing the whole spectrum peak-to-total counts ratio to a general threshold to determine the presence of significant shielding;

calculating a photopeak scattering metric on a per nuclide photopeak basis using the amount of excess counts in the scattered continuum regions immediately below and immediately above the peak energy region, relative to the net peak area for the nuclide; and indexing the photopeak scattering metric by energy to an expected shielding response function to yield an estimated attenuation factor to correct the nuclide activity measurements.

2. The method of claim 1 wherein the threshold is a value ranging from approximately 0.1 to 0.05.

3. The method of claim 1, the method steps further comprising:

comparing measured relative scattering characteristics to expected values for a range of shielding conditions to yield the estimated attenuation factor.

4. The method of claim 1, the method steps further comprising:

estimating the attenuation factor using the parameterized relationship of the following characterization equation:

$$\text{Attenuation Factor} = e^{Slope(\% \ Fraction-Offset)}, \text{ where}$$

$$\text{Offset} = AF[6] \times Energy^{AF[7]}$$

$$\text{Slope} = \begin{cases} AF[1] + AF[2] \times e^{AF[3] \times Energy}, & \text{Energy} < 500 \text{ keV} \\ AF[4] + AF[5] \times Energy, & \text{Energy} \geq 500 \text{ keV} \end{cases}.$$

5. The method of claim 1, wherein the threshold is derived using the detector device intrinsic peak-to-total calibration value applicable for an unshielded source.

6. The method of claim 1, the method steps further comprising:
analyzing the energy dependent scattering differential response by comparing measured relative scattering characteristics to expected values for a-range of shielding conditions to yield the estimated attenuation factor.

7. The method of claim 1 wherein the threshold is derived from a worst case energy calculation for the nuclide.

8. The method of claim 1 wherein the threshold is indexed by the weighted average energy of the spectrum photopeaks for the nuclide.

9. A computer software program tangibly embodied in a computer readable medium, the program including machine-readable instructions executable by a computer processor to perform a method of analyzing measured radiation spectra to determine an estimated nuclide attenuation factor for use in nuclide activity measurements, the program steps comprising:
obtaining a whole spectrum peak-to-total counts ratio for at least one nuclide source from at least one radiation detector spectrometer device;
comparing the whole spectrum peak-to-total counts ratio to a general threshold to determine the presence of significant shielding;
calculating a photopeak scattering metric on a per nuclide photopeak basis using the amount of excess counts in the scattered continuum regions immediately below and immediately above the peak energy region, relative to the net peak area for the nuclide; and
indexing the photopeak scattering metric by energy to an expected shielding response function to yield an estimated attenuation factor to correct the nuclide activity measurements.

10. The computer software program of claim 9 wherein the threshold is a value ranging from approximately 0.1 to 0.05.

11. The computer software program of claim 9, the program steps further comprising:
comparing measured relative scattering characteristics to expected values for a range of shielding conditions to yield the estimated attenuation factor.

12. The computer software program of claim 9, the program steps further comprising:
estimating the attenuation factor using the parameterized relationship of the following characterization equation:

$$\text{Attenuation Factor} = e^{Slope(\% \ Fraction-Offset)}, \text{ where}$$

$$\text{Offset} = AF[6] \times Energy^{AF[7]}$$

-continued $$\text{Slope} = \begin{cases} AF[1] + AF[2] \times e^{AF[3] \times Energy}, & \text{Energy} < 500 \text{ keV} \\ AF[4] + AF[5] \times Energy, & \text{Energy} \geq 500 \text{ keV} \end{cases}.$$

13. The method of claim 9, wherein the threshold is derived using the detector device intrinsic peak-to-total calibration value applicable for, an unshielded source.

14. The method of claim 9, the method steps further comprising:
analyzing the energy dependent scattering differential response by comparing measured relative scattering characteristics to expected values for a range of shielding conditions to yield the estimated attenuation factor.

15. The method of claim 9 wherein the threshold is derived from a worst case energy calculation for the nuclide.

16. The method of claim 9 wherein the threshold is indexed by the weighted average energy of the spectrum photopeaks for the nuclide.

17. A method of analyzing measured radiation spectra to determine an estimated nuclide attenuation factor for use in nuclide activity measurements, the method steps comprising:
obtaining a whole spectrum peak-to-total counts ratio for at least one nuclide source from at least one radiation detector spectrometer device;
calculating a photopeak scattering metric on a per nuclide photopeak basis using the amount of excess counts in the scattered continuum regions immediately below and immediately above the peak energy region, relative to the net peak area for the nuclide; and
indexing the photopeak scattering metric by energy to an expected shielding response function to yield an estimated attenuation factor to correct the nuclide activity measurements.

18. The method of claim 17, the method steps further comprising:
comparing the whole spectrum peak-to-total counts ratio to a general threshold to determine the presence of significant shielding.

19. The method of claim 18, wherein the threshold is derived using the detector device intrinsic peak-to-total calibration value applicable for an unshielded source.

20. The method of claim 18 wherein the threshold is derived from a worst case energy calculation for the nuclide.

21. The method of claim 18 wherein the threshold is indexed by the weighted average energy of the spectrum photopeaks for the nuclide.

22. The method of claim 17, the method steps further comprising:
comparing measured relative scattering characteristics to expected values for a range of shielding conditions to yield the estimated attenuation factor.

23. The method of claim 17, the method steps further comprising:
estimating the attenuation factor using the parameterized relationship of the following characterization equation:

$$\text{Attenuation Factor} = e^{Slope(\% \ Fraction-Offset)}, \text{ where}$$

$$\text{Offset} = AF[6] \times Energy^{AF[7]}$$

$$\text{Slope} = \begin{cases} AF[1] + AF[2] \times e^{AF[3] \times Energy}, & \text{Energy} < 500 \text{ keV} \\ AF[4] + AF[5] \times Energy, & \text{Energy} \geq 500 \text{ keV} \end{cases}.$$

24. The method of claim 17, the method steps further comprising:
analyzing the energy dependent scattering differential response by comparing measured relative scattering characteristics to expected values for a range of shielding conditions to yield the estimated attenuation factor.

25. A computer software program tangibly embodied in a computer readable medium, the program including machine-readable instructions executable by a computer processor to perform a method of analyzing measured, radiation spectra to determine an estimated nuclide attenuation factor for use in nuclide activity measurements, the program steps comprising:
obtaining a whole spectrum peak-to-total counts ratio for at least one nuclide source from at least one radiation detector spectrometer device;
calculating a photopeak scattering metric on a per nuclide photopeak basis using the amount of excess counts in the scattered continuum regions immediately below and immediately above the peak energy region, relative to the net peak area for the nuclide; and
indexing the photopeak scattering metric by energy to an expected shielding response function to yield an estimated attenuation factor to correct the nuclide activity measurements.

26. The computer software program of claim 25, the program steps further comprising:
comparing the whole spectrum peak-to-total counts ratio to a general threshold to determine the presence of significant shielding.

27. The computer software program of claim 26, wherein the threshold is derived using the detector device intrinsic peak-to-total calibration value applicable for an unshielded source.

28. The computer software program of claim 26 wherein the threshold is derived from a worst case energy calculation for the nuclide.

29. The computer software program of claim 26 wherein the threshold is indexed by the weighted average energy of the spectrum photopeaks for the nuclide.

30. The computer software program of claim 25, the program steps further comprising:
comparing measured relative scattering characteristics to expected values for a range of shielding conditions to yield the estimated attenuation factor.

31. The computer software program of claim 25, the program steps further comprising:
estimating the attenuation factor using the parameterized relationship of the following characterization equation:

$$\text{Attenuation Factor} = e^{Slope(\% \ Fraction - Offset)}, \text{ where}$$

$$\text{Offset} = AF[6] \times Energy^{AF[7]}$$

$$\text{Slope} = \begin{cases} AF[1] + AF[2] \times e^{AF[3] \times Energy}, & \text{Energy} < 500\,\text{keV} \\ AF[4] + AF[5] \times Energy, & \text{Energy} \geq 500\,\text{keV} \end{cases}.$$

32. The computer software program of claim 25, the program steps further comprising:
analyzing the energy dependent scattering differential response by comparing measured relative scattering characteristics to expected values for a range of shielding conditions to yield the estimated attenuation factor.

* * * * *